(12) United States Patent
Burke et al.

(10) Patent No.: US 6,495,756 B1
(45) Date of Patent: Dec. 17, 2002

(54) RETRACTABLE CORD ASSEMBLY

(75) Inventors: Paul C. Burke, Lake Forest, IL (US); Richard E. Skowronski, North Hampton, NH (US)

(73) Assignee: Telefonix, Inc., Waukegan, IL (US)

( * ) Notice: Subject to any disclaimer, the term of this patent is extended or adjusted under 35 U.S.C. 154(b) by 0 days.

(21) Appl. No.: 09/806,749

(22) PCT Filed: Oct. 5, 1999

(86) PCT No.: PCT/US99/23073

§ 371 (c)(1),
(2), (4) Date: Jun. 4, 2001

(87) PCT Pub. No.: WO00/21097

PCT Pub. Date: Apr. 13, 2000

Related U.S. Application Data

(60) Provisional application No. 60/103,177, filed on Oct. 6, 1998.

(51) Int. Cl.[7] ................................. H01B 7/00
(52) U.S. Cl. ................ 174/70 R; 174/69; 174/113 C; 242/580
(58) Field of Search ................ 174/70 R, 69, 174/71 R, 113 C, 131 A; 242/580, 407

(56) References Cited

U.S. PATENT DOCUMENTS

| | | | |
|---|---|---|---|
| 1,977,209 A | 10/1934 | Sargent | |
| 2,438,082 A | 3/1948 | Wester et al. | |
| 2,576,335 A | * 11/1951 | Fanslow | 242/407 |
| 3,349,163 A | 10/1967 | Rocton | |
| 3,598,895 A | 8/1971 | Garland | |
| 3,816,641 A | 6/1974 | Iversen | |
| 4,675,475 A | 6/1987 | Bortner et al. | |
| 4,773,879 A | 9/1988 | Pauza | |
| 4,844,373 A | 7/1989 | Fike | |
| 5,087,795 A | 2/1992 | Guginsky | |
| 5,094,396 A | 3/1992 | Burke | |
| 5,155,766 A | 10/1992 | Skowronski | |
| 5,332,329 A | 7/1994 | Hill et al. | |
| 5,535,960 A | 7/1996 | Skowronski et al. | |
| 5,574,250 A | * 11/1996 | Hardie et al. | 174/102 R |
| 5,608,190 A | 3/1997 | Skowronski et al. | |
| 5,744,218 A | * 4/1998 | Barnes | 174/69 |
| 5,789,711 A | 8/1998 | Gaeris et al. | |
| 5,817,980 A | 10/1998 | Kirma | |
| 5,969,295 A | * 10/1999 | Boucino et al. | 174/113 C |
| 5,973,264 A | * 10/1999 | O'Connor | 174/69 |
| 6,164,582 A | * 12/2000 | Vara | 242/407 |
| 6,169,251 B1 | * 1/2001 | Grant et al. | 174/113 R |
| 6,245,997 B1 | * 6/2001 | Serizawa et al. | 174/72 A |
| 6,259,031 B1 | * 7/2001 | Totland et al. | 174/110 R |
| 6,300,573 B1 | * 10/2001 | Horie et al. | 174/113 R |

FOREIGN PATENT DOCUMENTS

| | | |
|---|---|---|
| DE | 466572 | 10/1928 |
| DE | 3336617 A1 | 10/1983 |
| WO | WO9809415 | 8/1997 |

* cited by examiner

Primary Examiner—Dean A. Reichard
Assistant Examiner—Adolfo Nino
(74) Attorney, Agent, or Firm—Greer, Burns & Crain, Ltd.

(57) ABSTRACT

The retractable cord assembly (26) comprises a cable (28) having a central carrier and plural conductors helically wrapped about the central carrier. The assembly further includes a grommet for connecting the cable (28) to a device, the grommet having a head and stem, with a passage throught he head and stem for receiving the cable (28). The passgae is tapered to provide an enlarged proximal end when installed. The assembly further includes a flexible metal conduit (30) through which the cable slides. The cable outer surface is nylon braid and the conduit inner surface is a nickel plated to minimize friction therebetween.

18 Claims, 2 Drawing Sheets

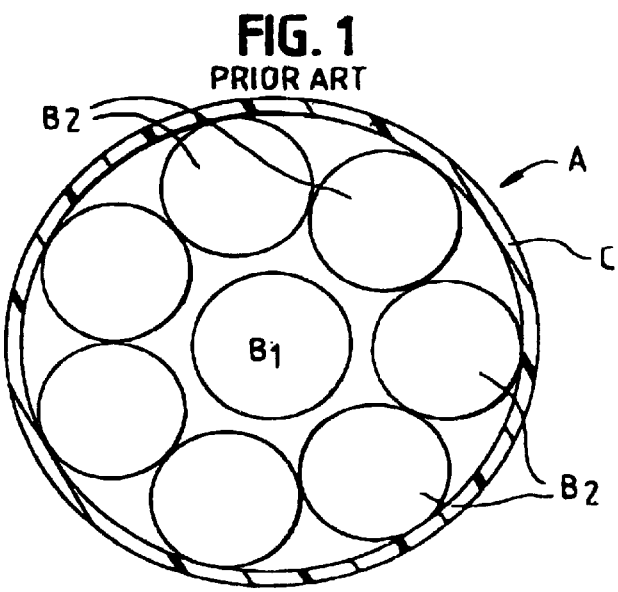
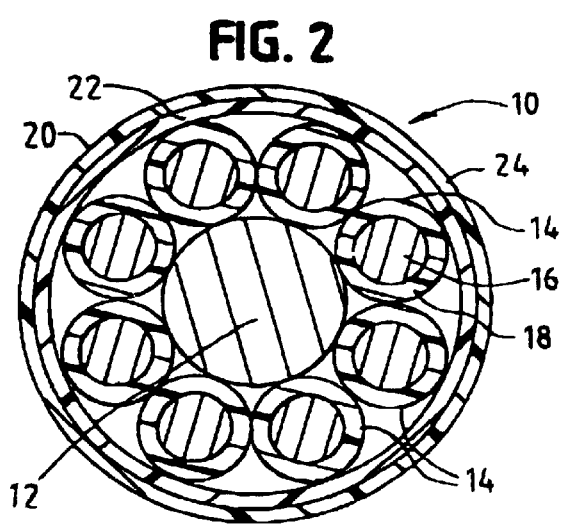
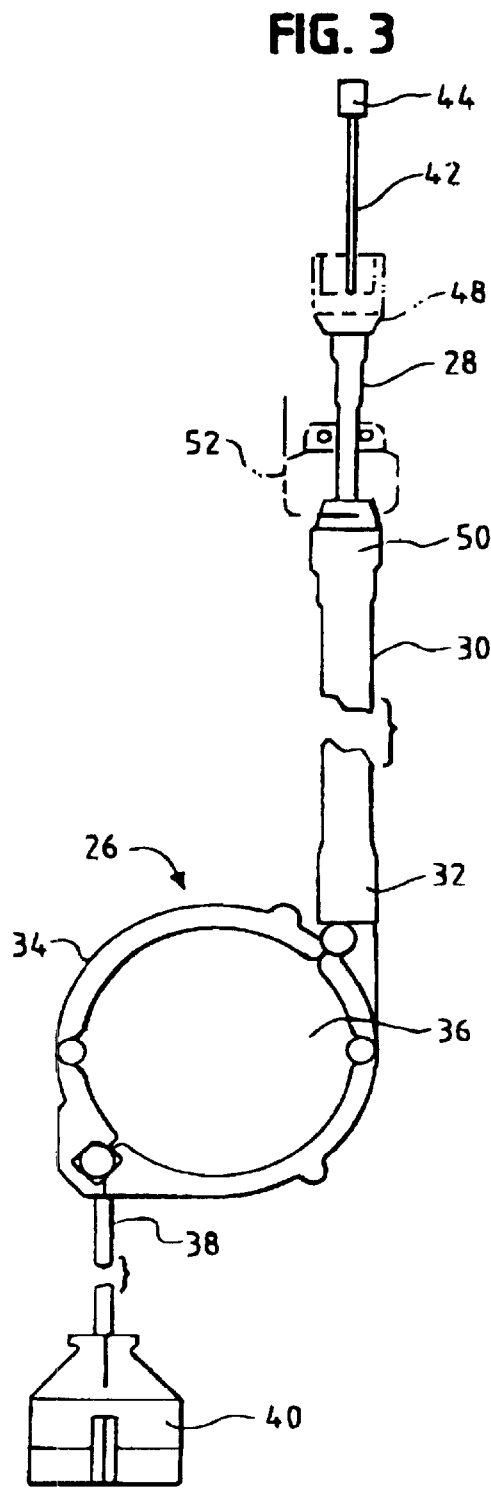

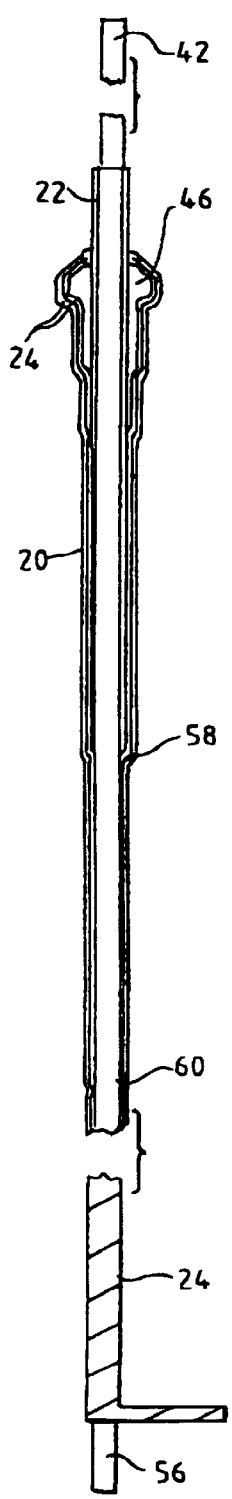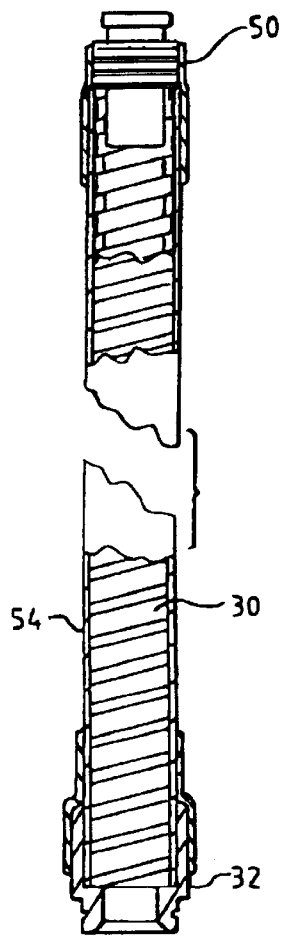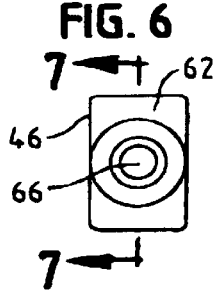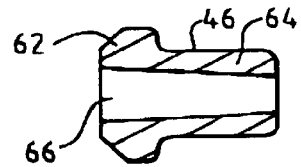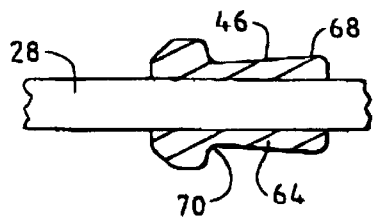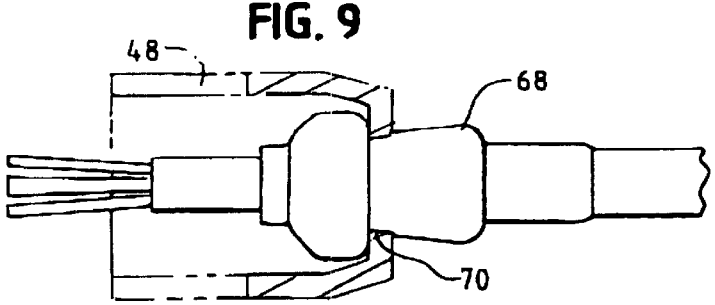

RETRACTABLE CORD ASSEMBLY

CROSS REFERENCE

This application claims the benefit of U.S. Provisional Application No. 60/103,177 filed Oct. 6, 1998.

FIELD OF THE INVENTION

The present invention relates to retractable cord assemblies for use with telephones and other electrical or electronic devices.

BACKGROUND OF THE INVENTION

Cord reels are used to retract and dispense cords for electrical devices such as telephones. To be operable, the cord must conduct electrical signals. Also, in the case of a retractable cord and reel, the cord may be under retractive spring pressure. Through use, including dispensing, retraction, bending and the like, these cords may eventually suffer failure.

Such cords typically compromise several individual conductors wrapped together. As such a cord bends and rotates, one of its conductors may fail. Upon the failure of a single conductor element, the entire cord is failed.

A frequent point of failure is at the point of connection between the retractable cord and the device. In the case of a telephone, for instance, the point where the cord joins the phone is a frequent failure point. As the handset is moved about, the cord at this connection point is bent at sharper angles than the remainder of the cord, and is thus under greater stress and/or strain. Also, as the handset is used, the cord at this point is rotated. These factors or increased wear at the device connection point often lead to premature failure.

Another frequent failure problem arises for applications that require the cord to travel through a conduit. In the case of a telephone on an airline seat, for instance, a retractable cord reel may be located under the seat, while the handset is located in the armrest. In such an example, the cord reel may be located up to several feet from the handset. A conduit is used to guide the retractable cord between the handset and the reel. In some cases, the conduit must be flexible, for example to allow the airline seat or armrest to fold.

Frequent failures occur under such conditions. One cause of failure is friction that develops between the cord and the conduit as the cord is pulled through the conduit. This friction leads to accelerate wear on the cord through heating of the surface and increased stress on the cord. Another cause of failure is through kinking or cracking of the conduit itself; particularly if it is required to move or otherwise flex. Friction between the retractable cord and conduit can cause the outer surface of the cord to fray or otherwise deteriorate. This increases friction between the cord and the conduit, making operation difficult. Further, this friction increases the stress on the cord and connections, likewise leading to a shortened service life. If the cord does not retract fully, as may be caused by excessive friction, the operator may improperly push or force the cord into the conduit, causing cord kinks, which may lead to failure.

An unresolved need therefore exists for an improved cord and cord reel device that offers improved failure free service life.

OBJECT OF THE INVENTION

It is an object of the invention to provide a multi-conductor cord that offers improved resistance to failure.

It is a further object of the invention to provide a device that offers improved resistance to cord failure at the point of connection to a device.

It is a still further object of the invention to provide a cord and conduit that offers reduced friction and improved durability.

SUMMARY OF THE INVENTION

The present invention comprises a cable having a central carrier and a conducting element wrapped about the central carrier. The present invention further comprises a grommet for connecting the cable to a device, the grommet having a head and stem, with a passage through the head and stem for passing the cable. The present invention further comprises a cable and conduit assembly, wherein the cable outer surface and the conduit inner surface are treated to minimize friction there between.

The cable of the present invention comprises a central carrier with one or more perimeter conductors wound about it. An outer insulating sheath may cover the carrier and conductors. Prior art cords that have several individual conductors are typically oriented with a central conductor and remaining conductors helically wound about the central conductor perimeter. It has been discovered that in such cords the central conductor is by far the most frequent failure of the conductors. While the exact reason for this is not known, it is believed that since the perimeter outer wrapped conductors wind about the central conductor in a helical fashion, they have a higher tolerance to withstand flex fatigue associated with bending and twisting. Also, as the cord may be bent or twisted, the helically wound perimeter outer conductors are free to slide or otherwise move, while the central conductor is more fixed in place.

In accordance with these beliefs, an improved cable has been developed which comprises a central carrier element and one or more perimeter conductors helically wrapped about the carrier. The central carrier may be comprised of any of a number of materials, chosen for their strength, relative inelasticity, and low cost. Preferred central carriers include cotton or other materials including synthetic fiber cord, such as nylon, Kevlar, or the like. Although perimeter conductors may be present in numbers from one to as many as may be required, it has been discovered that the present invention offers greatest improvement in service life in cords having at least 5 perimeter conductors. A non-conducting insulating sheath may be used to cover the carrier and perimeter conductors.

The present invention further comprises a grommet for improved connection of a cable to a device such as a telephone hand set. The grommet has a rectangular head portion, a stem portion, and a passage through the head and stem for passing a cord. The grommet head is placed in a device housing, with the stem extending out to receive the cable. The grommet may be comprised of any suitable resilient, compressible elastomer. The grommet of the invention satisfies several needs. The connection point between the cable and the device is a frequent location of failure from flex and torsion fatigue as it is a point of acute bending and twisting. The grommet decreases the cable failure rate as its stem lends flex support to the cable passing through it. As the head portion is rectangular, it resists pull through and rotation after being put in place in a device housing. Further, the grommet serves to anchor a braided sheath layer covering the cord conductors. The braided sheath is locked into place after being woven over the grommet.

Preferably, the passage through the grommet is tapered, with a smaller entrance at the stem end and a larger exit at the head end. When the cable is installed, the tapering results in the outside diameter of the distal end to be enlarged in greater degree than the proximal or head end of the stem. The enlarged outside diameter of the stem end helps to lock the grommet in place in a device.

The present invention further comprises a conduit and cable assembly for improved cable service life. Some cord reel applications require a cord reel to be located at a distance from a device (e.g. telephone handset) to be connected to the cord. In such applications, the cable is guided from the reel to the device by a conduit through which the cable passes. In order to improve the service life of the cable and conduit, the present invention comprises a cable with an outer surface and a conduit with an inner surface where the surfaces are designed to minimize friction there between. While the present invention may comprise surfaces of a wide variety of materials and treatments, a preferred cable comprised of a nylon braid in combination with a preferred conduit inner surface comprised of a smooth, hard, metal plating has been found to result in low friction and extended service life. Other materials may potentially be used, including a Teflon lubricant. The conduit inner surface may be comprised of a number of hard, smooth surfaces, including metallic platings such as electroless nickel plating, electrolytic nickel plating, or chrome plating. Generally, it has been discovered that a polymer cable covering in combination with a metallic plate conduit inner surface results in low friction. The conduit should further be chosen on a basis of flexibility so as to resist cracking, kinking, and collapse. Flexible metal conduits are preferred.

The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the preferred embodiment of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

The objects of the invention have been well satisfied. These advantages and others will become more fully apparent from the following detailed description when read in conjunction with the accompanying drawings.

BRIEF DESCRIPTION OF THE DRAWINGS

FIG. 1 is a transverse cross-section of a prior art eight conductor cable.

FIG. 2 is a transverse cross-section of an eight conductor cable of the invention.

FIG. 3 is an elevational view of a remote cord reel assembly of the invention.

FIG. 4 is a partial longitudinal cross-section of a conduit of the invention.

FIG. 5 is a partial longitudinal cross-section of a retractable cable of the invention.

FIG. 6 is an end view of a grommet of the invention.

FIG. 7 is a cross-section of the grommet taken along line 7—7 of FIG. 6.

FIG. 8 is a cross-section of the grommet with a cable installed.

FIG. 9 is a partial cross-section of a device housing with the grommet of the invention installed therein.

DETAILED DESCRIPTION OF A PREFERRED EMBODIMENT

The present invention will be further described in reference to a preferred embodiment of a cord management system for a telephone and/or other electronic devices for use in aircraft. As will be appreciated by those skilled in the art, many other embodiments and commercial applications of the invention are possible.

Referring now to FIG. 1, a prior art cable A is shown as comprising eight conductors B within an insulating jacket C. More specifically, the cable comprises a central conductor $B_1$. The remainder of the conductors $B_2$ are helically wound around the central conductor.

It has been discovered that cables that have a center conductor tend to have a short life when exposed to repeated tension and bending. As the cable is bent, the helical winding of the perimeter conductors evens out the tension that would normally result if the conductors were not wound. When a homogeneous material is exposed to bending, the outer fibers are exposed to tension, and the inner fibers are exposed to compression. In a helically wound cable, the peripheral primaries are at the outside of the bend for a portion of the overall bend, and are on the inside of the bend for the remainder. They thus expand for a portion of the bend as they are stretched on the outside of the bend, and contract as they are compressed on the inside for a portion. These effects tend to mitigate one another. Also, as they are free to slide on each other somewhat, the net tension or compression on any primary is very small. That is, all except for the center conductor.

The present invention comprises an improved cable 10 having a central carrier 12 and peripheral conductors 14 wrapped about the carrier. Conductors 14 comprise an interior conductive member 16 and outer insulating layer 18, as is well known in the art. By eliminating the center conductor and placing all conductors on the perimeter, the early failure of the center conductor is reduced or eliminated. The central carrier of the cable of the invention may be comprised of a number of different materials chosen for their resiliency, ease of use, cost and flexibility. A preferred central carrier is a fiber core such as cotton, nylon, Kevlar or the like, and acts as a mandrel around which the conductors are wound or wrapped. By moving the center conductor to the perimeter a larger diameter cable results, but the increase in flex life more than offsets the disadvantage of the larger size. The cable of the invention may comprise any number of conductors from two to many.

The cable further comprises an outer jacket 20. Jacket 20 may be a single layer or plural layers. In the preferred embodiment, the jacket comprises an inner insulating layer 22 formed of an elastomeric material and an outer layer of fabric braid 24. The fabric braid is preferably nylon.

FIG. 3 illustrates an improved cord reel assembly 26. The assembly comprises a cable 28 within a flexible conduit 30. Conduit 30 is attached at a proximal end 32 to a retractable cord reel 34. Reel 34 is preferably constructed as shown and described in U.S. Pat. No. 5,094,396 to Burke, but other reel designs may be used. Reel 34 has an outer housing 36 and inner spool (not shown) on to which a portion of cord 28 is wound. The assembly further comprises a fixed cable 38 that is connected to the retractable cable 28 within reel 34. A proximal end of fixed cable 38 carries a jack 40 for connection to a telephone or other electronic source, depending on the application. A distal end 42 of cable 28 carries a jack 44 for connection to a telephone handset or other remote device, again depending on the application. Near the distal end 42 of cable 28 is a grommet 46 that is adapted to be received in a remote device housing 48. A distal end 50 of conduit 30 is adapted to be mounted to a bracket 52 or other mount depending on the application.

Friction between the outer surface of the cable 28 the inner surface of the conduit 30 is minimized. In particular it has been discovered that an outer fabric braid on the cable in combination with a metal conduit with a nickel plated inner surface provide acceptably low friction and have superior durability and service life. Further, the flexible metal conduit of the present invention comprises a durable flexible conduit that minimizes failure due to kinking or collapsing.

The conduit 30 is shown in partial cross-section in FIG. 4. The conduit 30 is a metal conduit similar to that used to protect a public telephone handset cord. This conduit allows the retractable cord to extend and retract inside with less friction than conventional polymer conduits for remote cord reels. The metal conduit is also highly resistant to kinking since it inherently limits the bend radius during installation, and is very resistant to collapsing due to clamping. Applying smooth hard metal plating to the inside surface of the conduit further reduces friction. Electroless nickel plating is preferred. The conduit may also include a rubberized exterior layer 54, which may comprise elastomeric heat shrink tube.

FIGS. 2 and 5 illustrate the cable 28 of the invention. The cable has a distal end 42 and a proximal end 56 that is received in the reel 34. The cable preferably comprises a plurality layer jacket 20 having an inner insulating layer 22 and outer fabric braid layer 24. The insulating layer need not run the entire length of the cable, but need only extend for the length of cable intended to be exposed to severe twisting and bending during use. In FIG. 5, the insulating layer is shown being terminated at 58. A grommet 46 is attached near the distal end of the cable. The grommet 46 is placed over the insulating layer 22. The fabric layer 24 is braided over the grommet 46. Preferably, the braid is begun at a point 60 proximal to the grommet 46. The braid is then run distally over the grommet, at which point the direction is reversed and run proximally for the length of the cable.

The fabric layer is preferably nylon braid, which provides for a suitably low friction surface with the interior of conduit 30. Further reduction in friction may be accomplished by treating the outer surface of the cord. Teflon and silicone lubricants may be used in combination with the preferred nylon braid. Silicone lubricants however may not be suitable for some applications such as aircraft applications. Good results have been achieved with braided cable made with nylon thread impregnated the silicone by the textile manufacturer. This preferred cable comprises Nylon Type 66 yard, with 100 Denier/3 ply, and a density of approximately 13,700 yards/lb. It has a tensile strength of 4.5 lbs., and an approximately 8% silicone finish.

A preferred cable for aircraft applications comprises a coarser nylon braid with a light oil finish. The coarser braid results from use of a heavier nylon yarn, resulting in a thicker, more durable fabric layer. The thicker fabric layer resists core through failure, where the conductors breach the jacket. The coarser braid may also tend to reduce friction by reducing the amount of contact surface between the braid and the inner surface of the conduit.

The strain relief grommet assembly is shown in FIGS. 5–9. The grommet 46 of the invention has a rectangular head 62 and a stem 64. The head 62 may be of other non-circular shapes such as oval and polygonal. A passage 66 extends through the stem and head for receiving the cable 28. The cable is inserted through the elastomeric grommet, then braided over as described above. The shape of the grommet keeps the braid in place without the grommet protruding through the braid as described in U.S. Pat. No. 5,608,190 to Skowronski, which is incorporated by reference. The rectangular head portion of the grommet prevents rotation and pull-through. This configuration also keeps tensile loads on the nylon jacket and off the conductors, which can slide in the grommet if necessary.

As shown in FIG. 9, the stem portion 64 of the grommet protrudes through the molded plastic handset extension housing 48 providing some flex relief controlling the bending of the cable where it connects to the handset. In addition, the stem portion of the grommet after installation of the cable and nylon braid has a diameter larger than the hole in the device in which it is installed. Pulling the nylon braid on the round cable assembly through the hole in the handset extension housing causes the braid to tighten around the grommet (like Chinese finger cuffs) allowing the stem portion of the grommet to be pulled into the hole in the handset extension housing. It also stretches the nylon braid on the round cables slightly, reducing the stretch it would normally encounter during use. This prestretched condition improves the ability of the nylon braid to carry tensile and bending loads, keeping the load off the conductors, further improving flex life.

Preferably, as shown in FIG. 7, the passage 66 through the grommet head 62 and stem 64 portions is tapered. The passage diameter at the distal end of the stem portion is larger than the diameter at the proximal end of the stem portion. As shown in FIG. 8, this tapering results in the outside diameter of the proximal end 68 of the stem expanding in an amount larger than the distal end 70 of the stem when a cable is present in the passage. The expansion of the outside diameter helps to lock the grommet in place in the handset 48 as shown in FIG. 9.

The advantages of the present invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:
1. A cable, comprising
 a central carrier having a substantially circular cross-section;
 a plurality of conductors wrapped around said central carrier, said conductors being slidable relative to the carrier;
 a jacket covering said conductors;
 a grommet near one end of said cable, said grommet comprising a non-circular distal head portion and a proximal stem portion, said head and stem portions having a passage there through receiving said cable, a distal end of said stem adjacent said head having an outside diameter, and a proximal end of said stem having an outside diameter that is larger than said stem distal end outside diameter.

2. A cable as in claim 1 wherein said cable comprises at least five said conductors.

3. A cable as in claim 1, wherein said jacket comprises braided fabric.

4. A cable as in claim 1, wherein said jacket comprises an elastomeric insulator.

5. A cable as in claim 4, wherein said jacket further comprises a braided fabric layer over said elastomeric insulator.

6. A cable as in claim 1, wherein said central carrier comprises a substantially inelastic fibrous material.

7. A cable as in claim 1, wherein said jacket comprises a fabric braid, said braid extend over said conductors and said grommet.

8. A cable as in claim 1, wherein said jacket comprises an elastomeric insulator covered by a fabric braid layer, said grommet located over said elastomeric insulator and under said fabric braided layer.

9. A cable as in claim 1, further comprising a conduit over said cable, said conduit having a hard, smooth interior surface, and said cable being slidable within said conduit.

10. A cable and grommet assembly comprising, a plurality of conductors;

an insulating jacket over said conductors;

a grommet near a distal end of said cable, said grommet comprised of a compressible material and having a non-cylindrical shape, said grommet over said insulating jacket; and a fabric braid layer over said grommet and a portion of said insulating layer proximate to said grommet, said grommet within and not protruding from said fabric layer.

11. A cable as in claim 10, wherein said grommet comprises a distal head portion and a proximal stem portion, said head and stem portions having a passage there through receiving said cable, a distal end of said stem adjacent said head having an outside diameter, and a proximal end of said stem having an outside diameter that is larger than said stem distal end outside diameter.

12. A cable as in claim 10, wherein said cable includes a central carrier around which said conductors are wound.

13. A cable as in claim 12, wherein said cable comprises at least five said conductors helically wound around said central carrier.

14. A conduit and cable assembly, comprising a conduit having a hard, smooth interior surface; and a cable slidably held in said conduit, said cable extending and retracting within said conduit, said cable having an outer jacket comprising a fabric cover, said cover having a low coefficient of friction relative to said conduit interior surface, whereby said cable extends and retracts freely within said conduit.

15. An assembly as in claim 14, wherein said conduit is metal and said interior surface is nickel-plated and said fabric is nylon.

16. An assembly as in claim 14, further comprising a retractable cord reel having a housing and a spool, a proximal end of said conduit attached to said housing and a portion of said cable wound on said spool, said cord reel slidably retracting said cable within said conduit.

17. An assembly as in claim 14, wherein said cable comprises a central carrier and a plurality of conductors wound around said carrier.

18. An assembly as in claim 14, further comprising a grommet on a distal end of said cable and an insulating layer below said fabric cover, said grommet being installed over said insulating layer and under said fabric cover.

* * * * *